United States Patent [19]

McCollum

[11] 4,150,007

[45] Apr. 17, 1979

[54] AQUEOUS COATING OF CURABLE BINDER, CROSS-LINKER AND OXYETHYLATED 2,2,4-TRIMETHYLPENTANE-1,3-DIOL

[75] Inventor: Anthony W. McCollum, Longview, Tex.

[73] Assignee: Eastman Kodak Company, Rochester, N.Y.

[21] Appl. No.: 844,952

[22] Filed: Oct. 25, 1977

[51] Int. Cl.$^2$ .................... C08G 12/32; C08G 59/14; C08G 63/46; C08K 5/06

[52] U.S. Cl. .................... 260/29.4 R; 260/29.2 EP; 260/29.4 UA; 260/29.6 NR; 260/850; 260/851; 260/856; 528/301

[58] Field of Search .................... 260/29.2 E, 29.4 R, 260/29.4 UA, 29.6 TA, 29.6 E, 29.6 ME, 75 T, 67.6 R, 850, 851, 856

[56] References Cited

U.S. PATENT DOCUMENTS

| | | | |
|---|---|---|---|
| 3,267,174 | 8/1966 | Fry et al. | 260/856 |
| 3,352,806 | 11/1967 | Hicks | 260/856 |
| 3,959,202 | 5/1976 | Blank | 260/29.4 UA |

*Primary Examiner*—John C. Bleutge
*Assistant Examiner*—Arthur H. Koeckert
*Attorney, Agent, or Firm*—Edward R. Weber; Daniel B. Reece, III

[57] ABSTRACT

An adduct of ethylene oxide and 2,2,4-trimethylpentane-1,3-diol is useful as a reactant-diluent in water-borne coatings. Typically the adduct functions as a cosolvent, a flow control aid, and a reactive glycol which is incorporated in the final cured coating.

14 Claims, No Drawings

AQUEOUS COATING OF CURABLE BINDER, CROSS-LINKER AND OXYETHYLATED 2,2,4-TRIMETHYLPENTANE-1,3-DIOL

This invention relates to the use of an adduct of ethylene oxide and 2,2,4-trimethylpentane-1,3-diol as a reactive diluent in water-borne coatings.

In recent years, the coating industry has become increasingly interested in aqueous high solids coatings, i.e., coatings which can be applied by conventional techniques without the necessity of high amounts of organic solvents. The use of high solids coatings presents several advantages, including high film buildup per application, economy of materials since valuable organic solvents will not be lost to the ambient surroundings, and diminution of environmental control problems such as treatment of plant effluent to capture or destroy volatile pollutants. Additionally, environmental requirements presently being placed on coating systems have spurred much activity in the area of water based coating systems. Many desirable systems have only a limited solubility in water, and thus require the use of an additional organic cosolvent to permit an acceptable solids to solvent ratio. When conventional solvents are used as the cosolvent, this adds to the environmental pollution problem.

It is, therefore, an object of the instant invention to develop a material which would serve as a cosolvent and thus permit an increase in the solids to solvent ratio. An additional object is to develop a material which would react with the cross-link agent and remain in the finished film, thus reducing the environmental pollution problem.

These and other objects and advantages of the present invention will become more clearly apparent from the following description.

It has been found that the reaction product of ethylene oxide and 2,2,4-trimethylpentane-1,3-diol forms an adduct hereinafter referred to as the DIOL-EO adduct, which is useful as a reactive diluent in water-borne curable coatings.

It has been further found that the DIOL-EO adduct unexpectedly has high cosolvent power and produces a clear, aqueous solution when combined with the other coatings components. In this sense, it serves as an organic cosolvent for the reactive polyester, alkyd or acrylic polymer portion of the coating.

Typical acrylic polymers are those synthesized from hydroxyethyl acrylate, butyl acrylate, methyl methacrylate, acrylic acid or any other typical commercial acrylic resin usually containing pendant hydroxyl and carboxyl groups. Typically reactive polyesters are synthesized from glycols (neopentyl glycol, propylene glycol, 2,2,4-trimethylpentane-1,3-diol, or any other glycol), a triol (or polyol) such as trimethylolpropane or trimethylolethane and a diacid, polyfunctional acid or acid anhydride such as adipic acid, isophthalic acid, o-phthalic acid, or trimellitic anhydride. Such a polyester exhibits pendant hydroxyl groups and carboxyl groups.

A typical reactive polyester may be formulated from 2,2,4-trimethylpentane-1,3-diol, trimethylolpropane, isophthalic acid and adipic acid utilizing known techniques to yield a product having an acid number of 30 and a hydroxyl number of 100. The polyester is then neutralized to a pH of 8.0 with N,N-dimethylethanolamine to increase water solubility. Typically such a polyester has only a limited water solubility and, when amine neutralized, produces a milky emulsion in water. Surprisingly, however, even though the DIOL-EO adduct also has a limited solubility in water, the combination of the DIOL-EO adduct and the amine neutralized polyester gives a clear, water soluble solution. Additionally, the use of the DIOL-EO adduct provides a better coating with reduced pinholing, cratering, and orange-peel effect. Furthermore, the use of the DIOL-EO adduct increases the nonvolatile content of the coating because, as a reactive glycol, it is incorporated in the cured film. Other cosolvents commonly used, such as ethylene glycol monobutyl ether, are not incorporated in the film and must be entirely vaporized during the cure process.

The unique features of the DIOL-EO adduct are further exemplified when it is noted that the DIOL-EO adduct displays an inverse solubility in water. As the temperature is increased from 22° C. to 66° C., the solubility (i.e. grams of DIOL-EO adduct per 100 grams of water) decreases from about 5.4 grams to about 2.9 grams. This apparently has the effect of releasing the water from the coating composition as the temperature is increased and thus facilitates the flow out of the material to form a uniform coating prior to polymerization.

A typical formulation in which the DIOL-EO adduct might be useful could consist of from about 1 to about 20 weight percent of the DIOL-EO adduct, preferably about 6 to 8 percent; from about 10 to about 40 percent of a reactive polyester, alkyd or acrylic polymer, preferably about 15 to 25 percent; pigment to yield a pigment-binder ratio of from about 0.5 to about 1.5, preferably about 0.7 to about 0.9; a crosslinking agent of from about 0 to about 10 percent, typically about 3 to 8 percent; water from about 35 to about 65 percent, typically about 40 to 45 percent; and an amine neutralizing agent such as ammonia or other basic organic amine sufficient to induce water solubility.

The reactive polyester, alkyd or acrylic polymers are those well known in the art and can be produced by any of numerous widely used methods. The crosslinking agent likewise may be any of those commonly used, such as hexa(methoxymethyl)melamine, urea-formaldehyde, epoxy, and benzoguanamine.

The DIOL-EO adduct may be prepared by the reaction of a slight molar excess of ethylene oxide with 2,2,4-trimethylpentane-1,3-diol at a temperature of about 80° to about 160° C. preferably about 115° C. to 125° C. and a pressure of about 100 to 400 psig using from about 0.01 to about 0.1 weight percent of sodium hydroxide as a catalyst. Good results are obtained when the ratio of ethylene oxide to 2,2,4-trimethylpentane-1,3-diol is from about 0.5:1 to about 5:1. Typically, the DIOL-EO adduct obtained from a reaction of this type will be a mixture of components having the following typical composition:

$$CH_3\!\!-\!\!\underset{CH_3}{\overset{}{\diagup}}\!\!CHCHC(CH_3)_2CH_2O(CH_2CH_2O)_xH$$
$$\underset{OH}{|}$$

| | % Typical |
|---|---|
| $x = 0$ | 30 |
| $x = 1$ | 45 |
| $x = 2$ | 20 |
| $x = 3$ | 5 |

It is this mixture which is useful as a reactive diluent. Analysis of the products of the addition of ethylene oxide to the diol shows a 95% selectivity towards addition at the $C_1$ hydroxyl. The probable reaction and the point of addition are illustrated by the following formula:

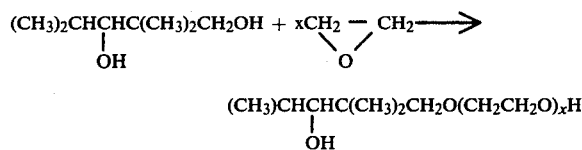

where x is an integer of 1 to 3. A minor (5% or less) fraction of the ethoxylated product results from addition at the $C_3$ hydroxyl as follows:

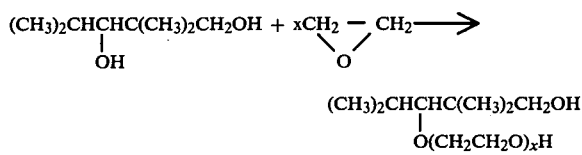

The following exemplary descriptions will illustrate more fully the benefits of the use of the DIOL-EO adduct in coating formulations and the properties of the formulated coatings. For comparative purposes, coatings formulated with no cosolvent (Example 1) and with the commonly utilized cosolvent ethylene glycol monobutyl ether (Example 2) are also shown. All formulations were prepared utilizing the following technique. A water-borne resin is placed in water with organic cosolvent or DIOL-EO adduct. The mixture is heated to 40°–60° C. and an amine neutralizing agent is added with stirring until the resin is solubilized in the aqueous phase. The remaining ingredients are introduced and the pigment is ground in a ball mill. The formulated coating is then adjusted to a sprayable viscosity (#4 Ford cup=20–60 sec.) and spray applied to the desired substrate. The coating is cured at 250°–350° F. for 15–30 minutes in a forced-air oven.

It may also be demonstrated that the DIOL-EO adduct is incorporated into the film during cure. To identical formulations of reactive polyester, hexa(methoxymethyl)melamine, water, catalyst (p-toluenesulfonic acid) and N,N-dimethylethanolamine, is added either DIOL-EO adduct or ethylene glycol monobutyl ether (see Table 2). A thin film of each is cured at 300° F. for 30 minutes. The weight loss of the film is calculated as the percent of the initial wet film which remains after cure. Theoretically, all of the DIOL-EO adduct could be retained in the cured film. The results of these experiments are presented in Table 2.

TABLE 2

| Cosolvent | DIOL-EO Adduct | Ethylene Glycol Monobutyl Ether |
| --- | --- | --- |
| Cosolvent, wt. % of formulation | 3.8 | 4.6 |
| Cured film, wt. % retained | 35.1 | 31.3 |

The observed weight percent retained in the two experiments correlates well with theory which indicates that none of the DIOL-EO adduct is lost and that all of the ethylene glycol monobutyl ether is lost. The observed weight difference (35.1–31.3) exactly equals the weight of the DIOL-EO adduct in formulation 1. This experiment demonstrates that essentially all of the DIOL-EO adduct is incorporated in the cured film.

The invention has been described in detail with particular reference to certain preferred embodiments thereof, but it will be understood that variations and modifications can be effected within the spirit and scope of the specification and the appended claims.

I claim:

1. A coating composition comprising a reactive binder component selected from the group consisting of polyesters, alkyd polymers and acrylic polymers, a cross-linking agent selected from aminoplast and epoxy crosslinking agents, and a solvent blend consisting of water and the adduct formed by the reaction, in a molar ratio of from about 0.5:1 to about 5:1, of ethylene oxide and 2,2,4-trimethyl-pentane-1,3-diol.

TABLE 1

Water-Borne Coatings Incorporating DIOL-EO Adduct, Ethylene Glycol Monobutyl Ether and a Formulation Containing No Organic Cosolvent

|  | Example 1 | Example 2 | Example 3 | Example 4 | Example 5 | Example 6 | Example 7 |
| --- | --- | --- | --- | --- | --- | --- | --- |
| Cosolvent | None | Glycol ether | DIOL-EO adduct | DIOL-EO adduct | DIOL-EO adduct | DIOL-EO adduct | DIOL-EO adduct |
| Formulation, weight % | | | | | | | |
| Solution | | | | | | | |
| Reactive Polyester* or | 16.8 | 18.8 | 18 | 22 | 19 | — | — |
| Acrylic Polymer | — | — | — | — | — | 15 | 28 |
| Water | 53.3 | 52.1 | 57.1 | 37 | 42.5 | 39.6 | 35.4 |
| N,N-dimethylethanolamine | 4.3 | 4.9 | 1.7 | 3 | 2.5 | 4 | 3 |
| Ethylene glycol monobutyl ether | — | 5.7 | — | — | — | — | — |
| DIOL-EO adduct | — | — | 2.7 | 8 | 4.8 | 10 | 6 |
| Grind, above solution plus | | | | | | | |
| $TiO_2$ | 20.7 | 13.7 | 14.3 | 20 | 25 | 28 | 26 |
| p-Toluenesulfonic acid | 0.2 | 0.2 | 0.2 | 0.2 | 0.2 | 0.2 | 0.1 |
| Hexamethoxymethylmelamine | 4.7 | 4.6 | 6 | 9.8 | 6 | 3.2 | 1.5 |
| Properties of Cured Film (300° F./15 minutes) | | | | | | | |
| Thickness, mils | 0.7 | 0.6 | 0.7 | 1 | 1 | 1 | 1 |
| Hardness, pencil | 3H | 3H | 2H | 3H | H | 4H | 3H |
| Gardner impact, in./lb. (forward/reverse) | 160/160 | 160/160 | 160/160 | 80/20 | 160/160 | 10/4 | 60/20 |
| Appearance of Film | Fair | Good | Excellent | Excellent | Excellent | Excellent | Excellent |

*Molecular weight 1450, hydroxyl number 60, acid number 45, prepared from 2,2,4-trimethylpentane-1,3-diol/trimethylol-propane/isophthalic acid/adipic acid.

2. The product of claim 1 wherein the adduct is present in the amount of from about 0.1 to about 20 percent of the total weight of the coating composition.

3. The product of claim 2 wherein the adduct is present to the extent of from about 6 to about 8 percent of the total weight of the coating composition.

4. A coating composition according to claim 1 wherein pigment is present to the extent of a pigment to binder ratio of from about 0.5 to 1.5.

5. A coating composition according to claim 1 wherein the ethylene oxide adduct is the mixture resulting from the reaction of ethylene oxide with 2,2,4-trimethylpentane-1,3-diol at a temperature of from about 80° C. to about 160° C. and a pressure of from about 100 psig. to about 400 psig. in the presence of from about 0.1 to about 1.0 weight percent sodium hydroxide.

6. The coating composition of claim 1 wherein the binder component is present in the amount from about 10 to about 40 percent, the crosslinking agent is present in the amount of from about 0 to about 10 percent, and the solvent mixture consists of from about 35 to about 65 weight percent of water and from about 0.1 to about 20 weight percent of the ethylene oxide adduct, based on the total weight of the coating composition.

7. A coating composition according to claim 6 wherein pigment is present to the extent of a pigment to binder ratio of from about 0.5 to 1.5.

8. A coating composition according to claim 6 wherein the ethylene oxide adduct is the mixture resulting from the reaction of ethylene oxide with 2,2,4-trimethylpentane-1,3-diol at a temperature of from about 80° C. to about 160° C. and a pressure of from about 100 psig. to about 400 psig. in the presence of from about 0.1 to about 1.0 weight percent sodium hydroxide.

9. A coating composition according to claim 8 wherein the ratio of ethylene oxide to 2,2,4-trimethylpentane-1,3-diol is from about 0.5:1 to about 5:1.

10. A coating composition according to claim 1 wherein the binder portion is present in the amount of from about 15 to about 25 percent, the crosslinking agent is present in the amount of from about 3 to about 8 percent, water is present in the amount of about 40 to 45 percent, and the ethylene oxide adduct is present in about 6 to 8 percent.

11. A coating composition according to claim 10 wherein pigment is present in an amount to yield a pigment to binder ratio of from about 0.7 to about 0.9.

12. A coating composition according to claim 10 wherein the ethylene oxide adduct is the mixture resulting from the reaction of ethylene oxide with 2,2,4-trimethylpentane-1,3-diol at a temperature of from about 80° C. to about 160° C. and a pressure of from about 100 psig. to about 400 psig. in the presence of from about 0.1 to about 1.0 weight percent sodium hydroxide.

13. A coating composition according to claim 12 wherein the ratio of ethylene oxide to 2,2,4-trimethylpentane-1,3-diol is from about 0.5:1 to about 5:1.

14. A coating composition according to claim 1 wherein the reactive binder is an hydroxyl and carboxyl group containing polyester and the crosslinking agent is hexamethoxymethylmelamine.

* * * * *